United States Patent [19]

Olnowich

[11] Patent Number: 5,263,172
[45] Date of Patent: Nov. 16, 1993

[54] MULTIPLE SPEED SYNCHRONOUS BUS HAVING SINGLE CLOCK PATH FOR PROVIDING FIRST OR SECOND CLOCK SPEED BASED UPON SPEED INDICATION SIGNALS

[75] Inventor: Howard T. Olnowich, Endwell, N.Y.

[73] Assignee: International Business Machines Corporation, Armonk, N.Y.

[21] Appl. No.: 509,664

[22] Filed: Apr. 16, 1990

[51] Int. Cl.⁵ .................................................. G06F 13/00
[52] U.S. Cl. .................................... 395/800; 395/325; 395/550; 395/775; 340/825.2; 364/131; 364/132; 364/240.3; 364/230.4; 364/270.3; 364/DIG. 1
[58] Field of Search ............... 395/800, 550, 325, 775; 340/825.2, 825.73; 364/131, 132

[56] References Cited

U.S. PATENT DOCUMENTS

| | | | |
|---|---|---|---|
| 4,412,282 | 10/1983 | Holden | 395/325 |
| 4,519,034 | 5/1985 | Smith et al. | 395/550 |
| 4,523,274 | 6/1985 | Fukunaga et al. | 395/325 |
| 4,580,213 | 4/1986 | Hulett et al. | 395/325 |
| 4,677,433 | 6/1987 | Catlin et al. | 340/825.2 |
| 5,077,686 | 12/1991 | Rubinstein | 395/550 |
| 5,109,490 | 4/1992 | Arimilli et al. | 395/325 |

Primary Examiner—Robert B. Harrell
Assistant Examiner—Alpesh M. Shah
Attorney, Agent, or Firm—Stephen A. Terrile

[57] ABSTRACT

A computer system which includes a synchronous digital, multibit system bus having a clock path, a master speed indicator path and a slave speed indicator path, a bus control circuit which provides first and second clocks to the clock path of the bus, the second clock having a different frequency than the first clock, and a master circuit and a slave circuit connected to the system bus. The master circuit includes master speed indication circuitry which provides a master speed indicator indicating the operating speed of the master circuit to the master speed indicator path. The slave circuit includes slave speed indication circuitry which provides a slave speed indicator indicating the operating speed of the slave circuit to the slave speed indicator path. The bus controller provides the second clock when the master speed indicator and the slave speed indicator indicate that the master circuit and the slave circuit both may function at the different frequency of the second clock.

11 Claims, 6 Drawing Sheets

MULTIPLE SPEED SYNCHRONOUS BUS HAVING SINGLE CLOCK PATH FOR PROVIDING FIRST OR SECOND CLOCK SPEED BASED UPON SPEED INDICATION SIGNALS

BACKGROUND OF THE INVENTION

The present invention relates to synchronous bus computer systems.

Generally in computer systems and especially in personal computer systems, data are transferred between various elements such as a central processing unit (CPU), input/output (I/O) adapters, I/O devices such as bus masters (i.e., elements which can control the computer system) or bus slaves as well as memory devices such as the system memory. These elements are often interconnected via a system bus which is part of a system architecture. The architecture is designed for the movement of data, address and command information with or between these elements. In personal computer systems, one such architecture has become an industry standard and is known as the Family I bus architecture.

The Family I bus architecture has become widely used by personal computers such as the IBM PC and PC/AT. The Family I bus architecture transfers information using eight parallel paths (an 8-bit wide bus) or 16 parallel paths (a 16-bit wide bus). A significant feature of the Family 1 bus architecture is the requirement of performing all transfers in synchronization with one basic clock signal, hereinafter referred to as a CLK signal. The CLK signal is an 8 MHZ signal which is provided to every element which is connected to the bus.

Because of the popularity of the Family I bus architecture, it has become advantageous to extend the Family I architecture to a 32-bit wide format. However, customer acceptance requires maintaining downward compatibility with the original Family I bus architecture. Presently, maintaining downward compatibility requires that all elements on the architecture's bus operate at the original Family I clock rate of approximately 8 MHz.

SUMMARY OF THE INVENTION

In summary, the invention is a computer system which includes a synchronous digital, multibit system bus having a clock path, a master speed indicator path and a slave speed indicator path, bus control circuitry which provides first and second clock signals to the clock path of the bus on a mutually exclusive basis, and master and slave circuits connected to the system bus. The master circuit includes master speed indication circuitry which provides a master speed indication signal to the master speed indicator path, and the slave circuit includes slave speed indication circuitry which provides a slave speed indication signal to the slave speed indicator path. The bus control circuitry provides the second clock signal when the master speed indication signal and the slave speed indication signal indicate that the master circuit and the slave circuit both may function at the second frequency.

For a fuller understanding of the invention, reference should be had to the following detailed description, taken in connection with the accompanying drawings. Throughout the figures, # indicates a logical NOT signal and * indicates a logical inversion.

DETAILED DESCRIPTION

Figure 1:
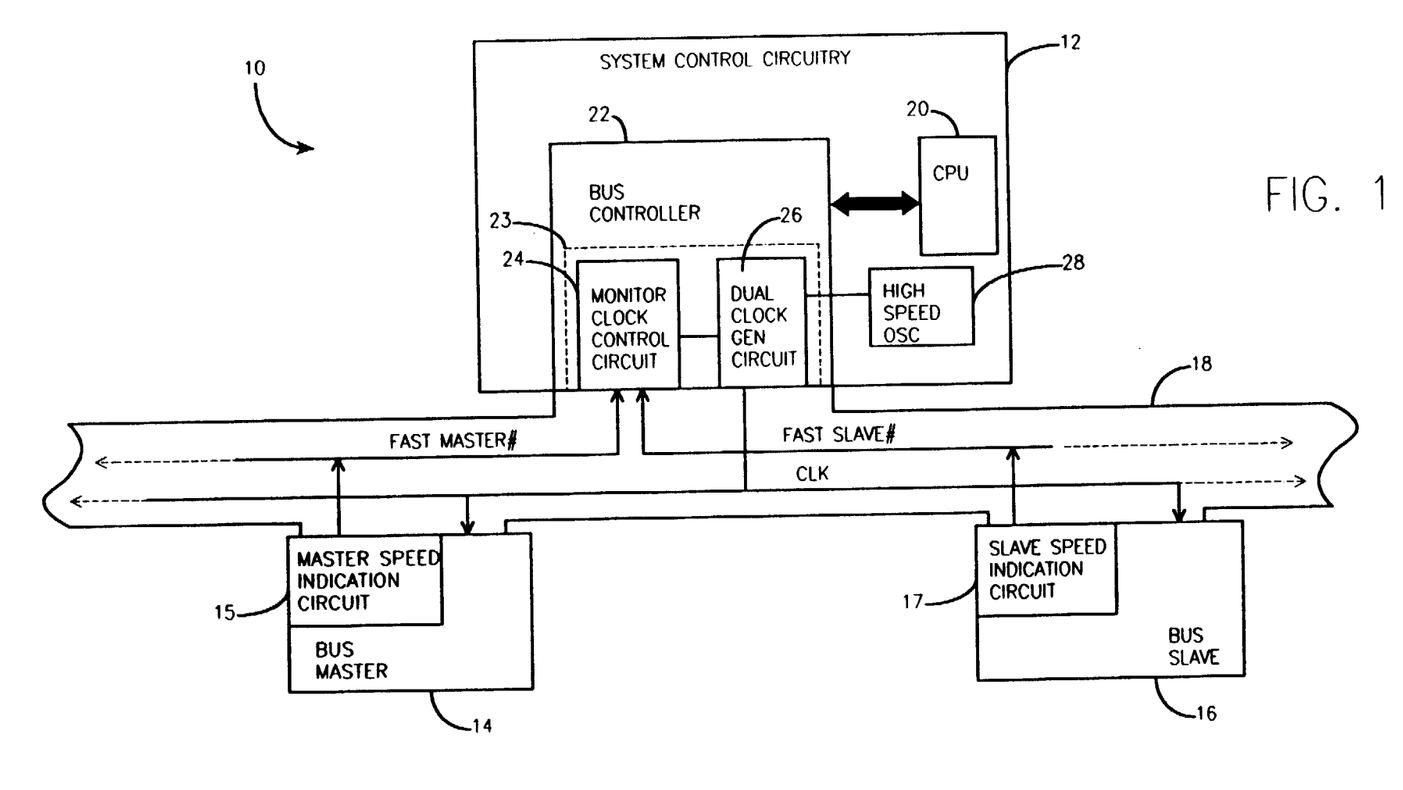
FIG. 1 shows a diagrammatic-block diagram of a computer system according to the present invention.

Referring to FIG. 1, computer system 10 includes system control circuit 12, bus master 14 and bus slave 16 which are all connected via synchronous, parallel, digital, multibit bus 18 (a portion of which is shown). It is understood that computer system 10 is not limited to this configuration but can include other bus masters and bus slaves. Bus master 14 and bus slave 16 being merely representative for purposes of describing operation of the present invention.

System control circuit 12, a centralized bus controller used only once per system, may function as a bus master. System control circuit 12 includes central processing unit (CPU) 20, which is connected to bus 18 via bus controller (BC) 22. BC 22 includes timing circuit 23 which includes monitor clock control circuit 24 which receives element speed indicator signals FAST MASTER# and FAST SLAVE# from bus 18 and controls dual clock generation circuit 26 which receives a high speed clock from high speed oscillator 28. If bus master 14 is capable of operating at a speed which is faster than the 8 MHz system clock, then bus master 14 includes master speed indication circuitry 15 which generates element speed indication signal FAST MASTER#. Likewise, if bus slave 16 is capable of operating at a speed which is faster than the 8 MHz system clock, then bus slave 16 includes slave speed indication circuitry 17 which generates element speed indication signal FAST SLAVE#.

In operation, BC 22 of system control circuitry 12 produces a system clock signal (CLK) which is passed to bus 18; bus 18 distributes the CLK signal to all elements which are connected to bus 18 (e.g., bus master 14 and bus slave 16).

According to the present invention, BC 22 is capable of generating a dual frequency CLK signal. The dual frequency CLK signal is generated based upon the states of two speed indicator signals, FAST MASTER# and FAST SLAVE#. The FAST MASTER# and FAST SLAVE# signals are generated by bus master 14 and bus slave 16 which have the capability of performing transfers which are faster than 8 MHZ.

A bus master 14 which controls bus 18 activates the FAST MASTER# signal (i.e., drives it to logic 0) to signify high-speed capability. On bus 18, the FAST MASTER# signal path is pulled up by an active pull-up resistor. Accordingly, elements which are connected to bus 18 but do not utilize the FAST MASTER# signal cannot drive this signal path to 0. If an element cannot drive the FAST MASTER# signal path to 0 then the element cannot perform transfers at any rate other than 8 MHz.

Likewise, a slave card 16 capable of performing fast transfers activates the FAST SLAVE# signal. The FAST SLAVE# signal path is pulled up by an active pull-up resistor to allow for compatibility with slower elements.

In operation, BC 22 monitors the two speed indication signals; when the FAST SLAVE# signal and FAST MASTER# signal are on the bus simultaneously, BC 22 generates and sends a higher frequency clock signal over the CLK signal line. Thus, enabling the two devices to communicate at a second frequency which is higher than 8 MHZ. Accordingly, BC 22 provides an 8 MHz CLK signal over bus 18 via the CLK signal line as well as a second higher frequency clock signal over the same CLK signal line on a mutually exclusive basis. Bus 18 is thus capable of operating at either 8 MHZ or a second higher speed frequency as controlled by BC 22.

Figure 2:
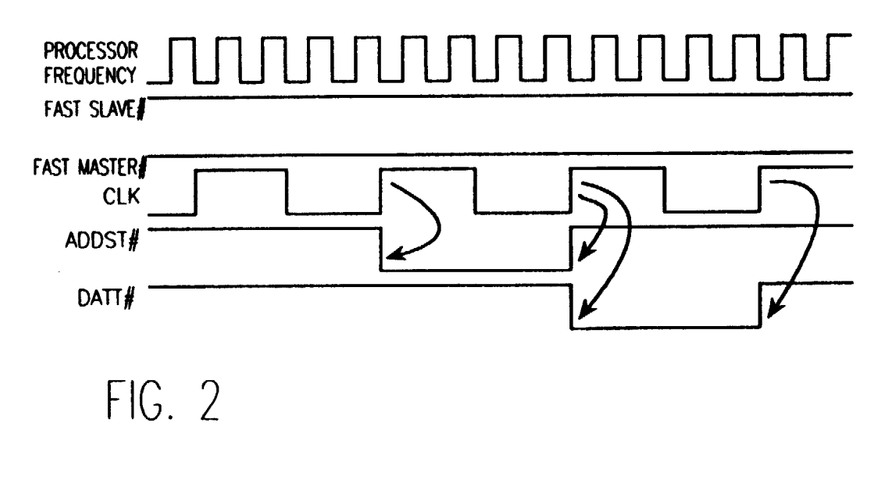
FIGS. 2-4 show timing diagrams of a computer system according to the present invention.

Referring to FIG. 2, a transfer sequence between 8 MHZ elements is shown. Because the FAST MASTER# and FAST SLAVE# speed indication signals are not activated, BC 22 generates an 8 MHZ CLK signal. Accordingly, the transfer of information, which is controlled by an address start signal (ADDST#), which indicates the start of an address transfer, and a data transfer signal (DATT#), which indicates the occurrence of a data transfer, is at 8 MHz.

Figure 3:
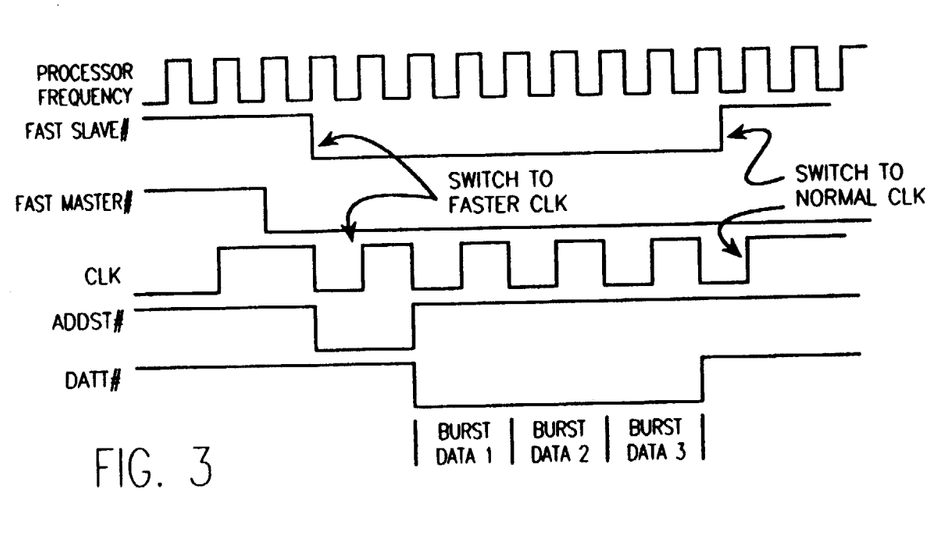
Figure 4:
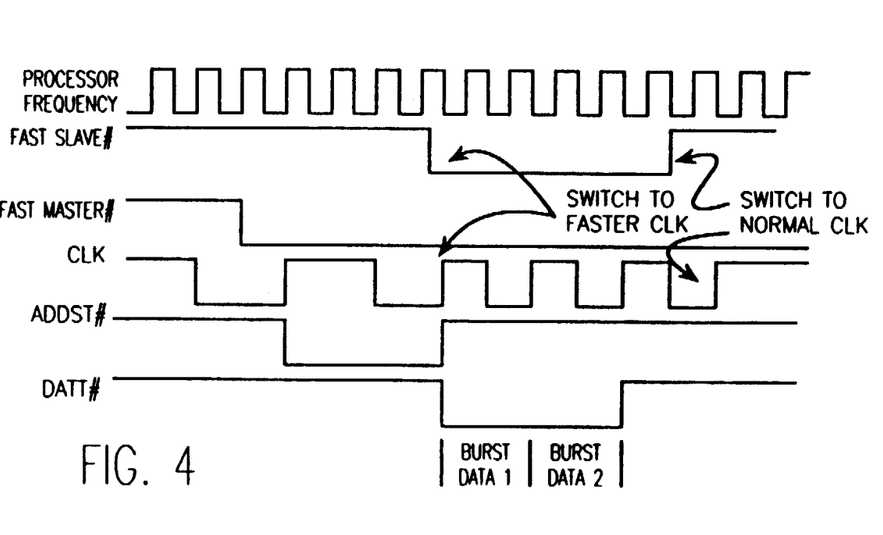

Referring to FIGS. 3 and 4, a transfer sequence between elements which function at the second higher frequency is shown. A bus master 14 (i.e., either bus master 14 or system control circuit 12) is selected prior to an individual transfer sequence by standard bus arbitration. If the master which is selected is configured to operate at the second higher speed, it activates the FAST MASTER# signal. Prior to the transfer, the bus master selects a bus slave 16 to participate in the subsequent transfer by providing an address which corresponds to this slave over bus 18. If this slave can function at the second higher frequency, it provides an active FAST SLAVE# speed indication signal over bus 18. While the master may immediately activate the FAST MASTER# signal, the slave must wait until it recognizes its address on the bus before it can activate the FAST SLAVE# signal.

FIG. 3 shows a transfer sequence in which a slave activates the FAST SLAVE# signal before BC 22 issues the ADDST# signal. In this case, BC 22 changes the CLK signal to the second higher frequency, thus allowing a high speed address transfer as well as subsequent data transfer. The data portion of the transfer can be a single transfer or multiple BURST mode transfers. When the high speed transfer is completed, the slave gets off bus 18 which deactivates its FAST SLAVE# signal. When the FAST SLAVE# signal is deactivated, BC 22 switches back to providing the 8 MHZ CLK signal.

FIG. 4 shows a transfer in which the slave activates the FAST SLAVE# signal after BC 22 has issued the ADDST# signal. In this case, the address transfer takes place at the 8 MHZ clock rate, after which, the CLK signal is changed to the second higher frequency and data is transferred at the higher rate. This transfer sequence has a significant impact on transfer speeds of transfers which are performed as part of long BURST mode operations.

Figure 5:
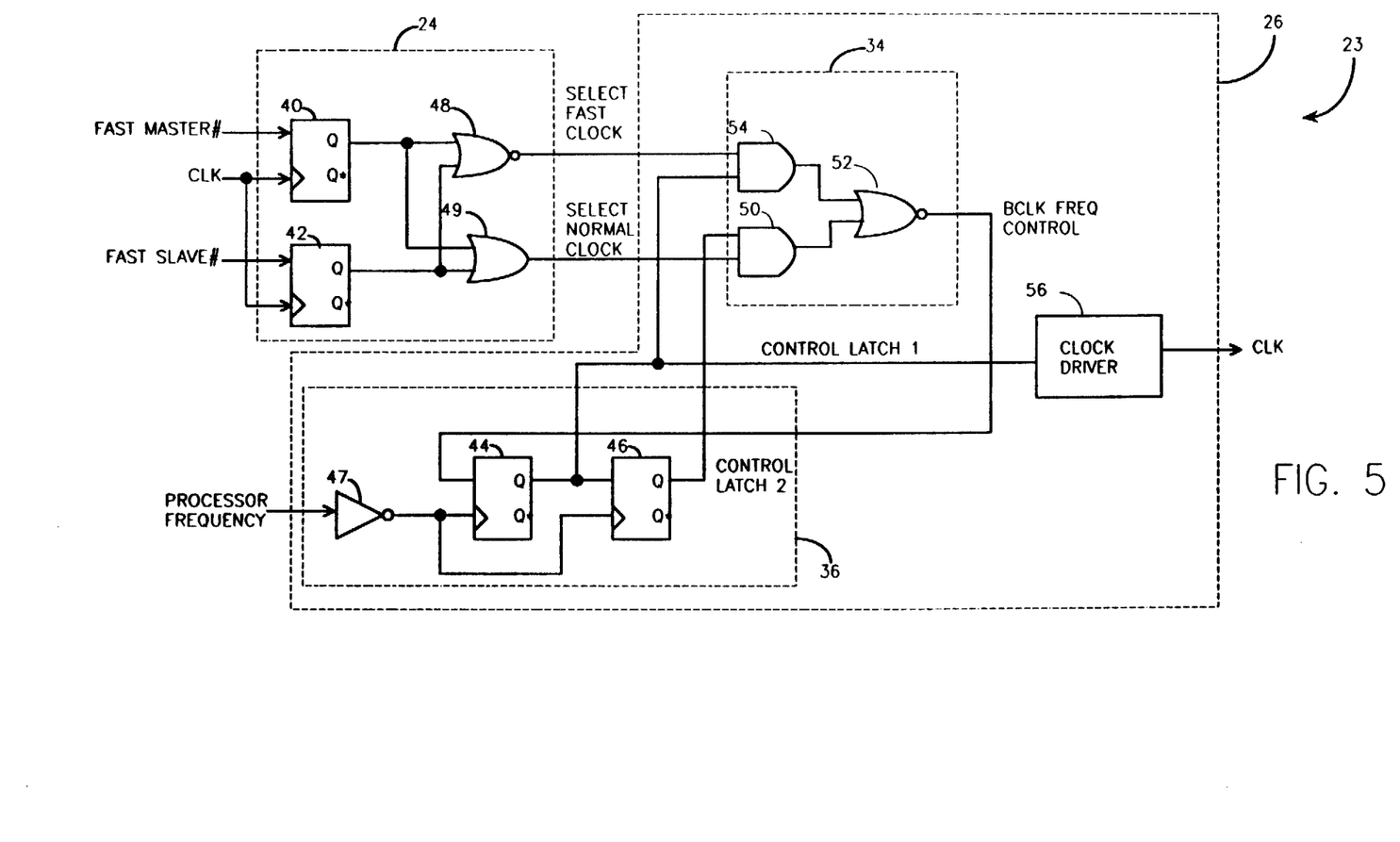
FIG. 5 shows a schematic diagram of a timing circuit of the FIG. 1 computer system.

Referring to FIG. 5, timing circuit 23 generates a dual speed CLK signal in which the faster CLK signal is twice the speed of the 8 MHz CLK signal. A high-speed oscillator frequency signal is used to generate both the 8 MHz CLK signal as well as the second higher frequency CLK signal. The use of the same high speed clock frequency signal allows switching between the two clock speeds without producing noise on the CLK line. In the preferred embodiment, the processor frequency which is generated by system control circuit 12 is used to generate the CLK signal because the processor frequency is already available to BC 22 and may be divided to provide the 8 MHZ frequency.

Timing circuit 23 includes monitor clock control circuit 24 and dual clock generation circuit 26. Dual clock generation circuit 26 includes selection circuit 34 and divider circuit 36. Selection circuit 34 selectively controls by how much divider circuit 36 divides an incoming frequency.

Monitor clock control circuit 24 includes latches 40 and 42 which receive the FAST MASTER# and FAST SLAVE# signals, respectively, as input signals from bus 18. These signals are sampled and latched at the rise of the CLK signal. Accordingly, when the CLK signal switches to a different frequency, the transition occurs at the rise of the CLK signal. Latches 40 and 42 sample and latch the input signals on the rise of the CLK signal to provide inputs to NOR gate 48 and OR gate 49. When both the FAST MASTER# and FAST SLAVE# signals are low, this change causes NOR gate 48 to cause the SELECT FAST CLOCK signal to go high and OR gate 49 to cause the SELECT NORMAL CLOCK signal to go low. When either or both the FAST MASTER# signal and the FAST SLAVE# signal are high, this change cause NOR gate 48 to cause the SELECT FAST CLOCK signal to go low and OR gate 49 to cause the SELECT NORMAL CLOCK signal to go high.

Selection circuit 34 includes AND gate 50, NOR gate 52, and AND gate 54. AND gate 54 functions as a selector which, when the SELECT FAST CLOCK signal is high, allows the signal generated by latch 44 (CONTROL LATCH 1) to be applied to NOR gate 52. AND gate 50 functions as a selector which, when the SELECT NORMAL CLOCK signal is high, allows the signal generated by latch 46 (CONTROL LATCH 2) to be applied to NOR gate 52. NOR gate 52 provides a frequency control signal (CLK FREQ CONTROL) to the input of divider circuit 36.

Divider circuit 36 includes control latches 44, 46 which divide an incoming processor frequency (PROCESSOR FREQUENCY) which is inverted by invertor 47. The incoming frequency is approximately 32 MHZ; this frequency may be divided by a factor of two by latch 44 to provide a 16 MHZ clock. This 16 MHz clock may be divided by a factor of two by latch 46 to provide an 8 MHZ clock. The output of latch 44 is controlled by the CLK FREQ CONTROL signal which is received from NOR gate 52; this output is driven via driver 56 onto the CLK line of bus 18.

OTHER EMBODIMENTS

Other embodiments are within the following claims.

For example, timing circuit 23 may be used to generate a second higher frequency which is any even multiple of the high speed oscillator frequency. This is accomplished by inserting an even number of latches which correspond to latches 44 and 46 in the frequency path of divider circuit 36.

Figure 6:
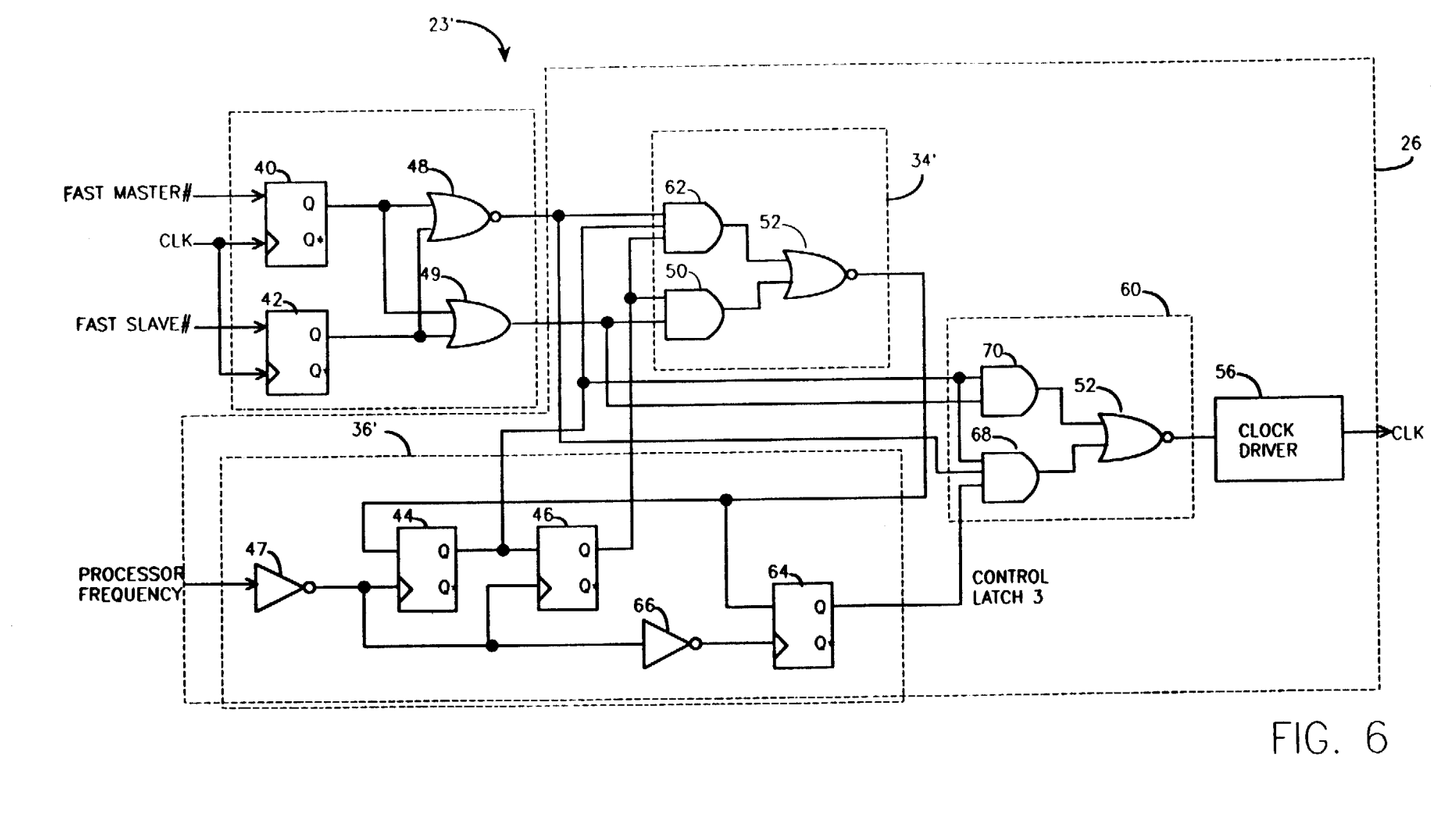
FIG. 6 shows a schematic diagram of an alternate timing circuit of the FIG. 1 computer system.

Also, for example, a timing circuit may be used which generates a second higher frequency which is an odd multiple of the high speed oscillator frequency. More specifically, FIG. 6 shows timing circuit 23' which provides a dual frequency CLK signal in which the second higher frequency is 1.5 times faster than the 8 MHz CLK frequency. If the PROCESSOR FRE- QUENCY signal is in the vicinity of 32 MHZ, it is divided by a factor of four to generate the 8 MHZ clock signal and by a factor of three to produce the 12 MHz second clock signal.

Timing circuit 23', which is similar to timing circuit 23, includes monitor clock control circuit 24 and dual clock generation circuit 26. Dual clock generation circuit 26 includes selection circuit 34' and divider circuit 36' as well as selection circuit 60.

Selection circuit 34' differs from selection circuit 34 by replacing two-input AND gate 54 with three-input AND gate 62, which, in addition to receiving the SELECT FAST CLOCK and CONTROL LATCH 1 signals, receives the CONTROL LATCH 2 signal. Anding the CONTROL LATCH 1 and CONTROL LATCH 2 signal produces a third signal which, when the SELECT FAST CLOCK signal is high, is the proper frequency but is not a square wave. This third signal is provided to OR gate 52 to provide the CLK FREQ CONTROL signal.

Divider circuit 36' differs from divider circuit 36 by adding latch 64, which receives the double inverted high speed clock from invertor 66 as well as the CLK FREQ CONTROL signal from selection circuit 34'. Because the clock for latch 64 is not inverted, latch 64 produces a signal which is half a clock period sooner than the signal produced by latch 44.

Selection circuit 60 includes AND gate 68, AND gate 70, and OR gate 72. AND gate 68 is used to produce a high speed square wave clock by anding the CONTROL LATCH 1 and CONTROL LATCH 3 signals when the SELECT FAST CLOCK signal is high. Anding these signals allows a square wave which is 1.5 times faster than the CONTROL LATCH 1 signal to be provided to OR gate 72. AND gate 70 allows the CONTROL LATCH 1 signal to be passed to OR gate 72 when the SELECT NORMAL CLOCK signal is high. OR gate 72 provides its output signal to clock driver 56 which drives the high speed CLK signal onto bus 18.

Timing circuit 23' may be used to generate a second higher frequency which is any odd multiple of the high speed oscillator frequency. This is accomplished by inserting an odd number of latches which correspond to latches 44, 46 and 64 in the frequency path of divider circuit 36'.

Also, for example, the number of frequencies at which the system clock operates may be expanded simply by adding more element speed indicator lines. More specifically, if each element has two speed indicator lines, then the system clock could operate at four different frequencies depending on the speed of the elements that are communicating. The speed of the slower element that is communicating would be the determinative factor in adjusting the speed of the system clock.

What is claimed is:

1. A computer system comprising
   a synchronous digital, multibit system bus,
      said bus including a clock path, a master speed indicator path and a slave speed indicator path,
   bus control circuitry electrically coupled to said system bus,
      said bus control circuitry providing first and second clock signals to said clock path of said bus such that only one of said first and second clock signals is provided to said clock path at a time,
      said first clock signal having a first frequency and said second clock signal having a second frequency, said second frequency being faster that said first frequency,
      said bus control circuitry being configured to receive a master speed indication signal via said master speed indicator path and a slave speed indication signal via said slave speed indicator path,
   a master circuit electrically coupled to said system bus,
      said master circuit including master speed indication circuitry,
         said master speed indication circuitry being configured to provide said master speed indication signal indicating an operating speed of said master circuit to said master speed indicator path, and
   a slave circuit electrically coupled to said system bus,
      said slave circuit including slave speed indication circuitry,
         said slave speed indication circuitry being configured to provide said slave speed indication signal indicating an operating speed of said slave circuit to said slave speed indicator path,
      said bus control circuitry being configured to provide said second clock signal when said master speed indication signal and said slave speed indication signal indicate that said operating speed of said master circuit and said operating speed of said slave circuit correspond to said second frequency, otherwise said bus control circuitry being configured to provide said first clock signal, said first clock signal being a default clock signal,
   wherein said master circuit and said slave circuit operate at a speed corresponding to either said first clock signal or said second clock signal.

2. The computer system of claim 1 wherein said bus control circuitry uses a high frequency clock to generate both said first clock signal and said second clock signal.

3. The computer system of claim 1 wherein
   said bus control circuitry includes
      a monitor clock control circuit configured to receive said speed indication signals and to generate a control signal indicating whether said master and slave function at said different frequency, and
      a dual clock generation circuit configured to receive said control signal and to provide one of said first clock signal and said second clock signal based upon said control signal.

4. The computer system of claim 3 wherein
   said dual clock generation circuit includes
      a selection circuit configured to select one of said first and second clock signals, and
      a divider circuit configured to generated said first and second clock signals from a single high frequency clock.

5. The computer system of claim 4 wherein
said second clock frequency is an even multiple of said high frequency clock.

6. The computer system of claim 5 wherein
said second clock frequency is double that of said high frequency clock.

7. The computer system of claim 4 wherein
said second clock frequency is an odd multiple of said first clock frequency.

8. The computer system of claim 7 wherein said second clock frequency is 1.5 times faster than said first clock frequency.

9. The computer system of claim 1 wherein
said master speed indicator path and said slave speed indicator path are pulled up, and
said master speed indication signal and said slave speed indication signal are active low signals.

10. The apparatus of claim 1 wherein said master circuit includes said bus control circuit.

11. The apparatus of claim 1 further comprising
a system control circuit connected to said system bus, and
wherein
said system control circuit includes said bus control circuit.

* * * * *